United States Patent Office 3,084,143
Patented Apr. 2, 1963

3,084,143
VINYL POLYMERIZATION SHORTSTOPPING PROCESS
Clarence E. Hieserman, Thomas M. Veazey, and Kenneth R. Lea, Decatur, Ala., assignors, by mesne assignments, to Monsanto Chemical Company, St. Louis, Mo., a corporation of Delaware
No Drawing. Filed May 2, 1960, Ser. No. 25,870
10 Claims. (Cl. 260—85.5)

This invention relates to a new and improved process of polymerization and recovery of unreacted monomer of vinyl polymerization in a redox catalyst system. More particularly this invention relates to a process of inhibiting or shortstopping a copolymerization reaction in a redox catalyst system of vinyl monomers by the use of an oxalate ion and hydrogen peroxide where polymerization is still taking place, and the recovery of a substantially pure reacted monomer.

In the addition polymerization of vinyl monomers, the composition of the resulting polymer generally undergoes constant change during its formation. In the case of mixtures of such monomers, the percentage composition represented by the various monomers in the resulting copolymers undergoes change throughout the course of the polymerization reaction. Changes in the physical properties of the resulting polymers take place constantly during the reaction and the properties of the final polymers depends to a large extent on the degree of completion of the polymerization reaction. Such properties that vary constantly during the course of the polymerization includes the specific viscosity of the resulting polymer, its average molecular weight, its solubility in various solvents etc. Therefore, it is highly desirable to provide a method for the controlled termination or shortstopping of such polymerizations at any desired point and the recovery of an essentially pure unreacted monomer. In the case of continuous polymerization systems it is particularly necessary to be able to provide for such termination or shortstopping where the polymer produced must be held in the form of slurry or emulsion in contact with unreacted monomers and catalysts for varying periods of time before separation. Thus, in an aqueous polymerization of an acrylonitrile polymer or copolymer with another vinyl monomer wherein the polymer produced is withdrawn from the polymerization vessel in the form of an aqueous slurry containing substantial quantites of unreacted monomers and catalysts in solution, the physical properties and composition of the polymer existing at the time of withdrawal of the slurry are considerably changed if polymerization of any of the monomers present in solution is allowed to continue beyond that point. Such continued polymerization is the inevitable result of holding the unterminated polymer in contact with monomers and catalysts for varying periods of time prior to final separation of the poylmer product. It has therefore been considered very desirable to develop means for controlled and definite termination of polymerization of vinyl monomers as well as recovery of these monomers in as pure a state as possible so they may be easily used in subsequent polymerization reactions.

Many methods have been suggested in the past for achieving such controlled termination or shortstopping of the polymerization reaction and recovery of the unreacted monomer in a substantially pure state. However, none have been fully satisfactory, particularly for use in the production of polymers to be employed in making synthetic fibers. This has been due to the severe restriction on the introduction of color into such polymers imposed by the needs of the textile industry. Substantial halting of the polymerization reaction can be accomplished by cooling the reaction mass, but this is not satisfactory as expensive equipment will be necessary, and it is almost impossible to cool a large mass quickly so that additional polymerization beyond that desired will be prevented. Moreover, the means for separation of the polymer from the reacting mass, which includes the unreacted monomers, often involve temperature conditions which will again induce polymerization making the cooling procedure ineffective. Much work has been directed towards discovering compounds which would act as shortstopping agents for the addition polymerization reaction and would aid in keeping down impurities in the unreacted monomer mass. Such compounds as furfural, hydroquinone, salts of dithiocarbamic acids and oxalates alone have been widely used for shortstopping. However, these previously proposed compounds have either been found to be ineffective in completely halting the polymerization or have been found to be effective only in such concentrations as result in extreme staining or discoloration of the polymer product and adding also to the impurity of the unreacted monomers. Also, quantities of reducing agents, such as sodium bisulfite, thiosulfate or oxalates well in excess of the amount normally used in a redox catalyst system are present. In addition, it is economically desirable to recover the unreacted monomers present in the shortstopped slurry. This has been done by steam stripping of the aqueous liquor from the polymer separation step. If a sulfoxy reducing agent such as a sulfite, bisulfite or sulfur dioxide has been used in the redox catalyst system, or if one of these materials were used as a shortstop, the aqueous liquor would contain free sulfur dioxide which then passed overhead with the unreacted monomer in the recovery system during the steam stripping operation and tend to cause polymerization in subsequent parts of the recovery system, thus plugging the recovery system and resulting in a shut down which is expensive and time consuming. The sulfur dioxide can be chemically bound prior to steam stripping by reaction with sodium bicarbonate to produce sodium bisulfite or the sulfur dioxide can be bound by reaction with other alkaline reagents; however, if the sulfur dioxide is bound by an alkaline reagent, the pH of the resulting solution is sufficiently high, above about 4.5 to cause hydrolysis of the vinyl esters to an acid and a carbonyl compound. For example, vinyl acetate hydrolyzes to acetic acid and acetaldehyde. The acetaldehyde passes overhead during the steam stripping and is found in the recovered monomers where it is an objectionable impurity because of its action in tying up the sulfur dioxide of the redox catalyst in subsequent polymerization using the recovered monomers thus causing a change from the desired specific viscosity.

An object of this invention is to provide an effective and rapid acting shortstop for a redox catalyzed vinyl polymerization which has no adverse effect on polymer quality and on the recovery and subsequent reuse of unreacted monomers.

Another object is to shortstop the reaction of a redox catalyzed vinyl polymerization and to recover the unreacted monomers free of sulfur dioxide, low in aldehyde content, and requiring no further purification prior to reuse in subsequent polymerization.

Another object is to shortstop the reaction of a redox catalyzed vinyl polymerization and to prevent premature polymerization of recovered monomers in the monomer recovery system.

Another object is to shorstop the reaction of a redox catalyzed vinyl polymerization and to remove sulfur dioxide from the aqueous unreacted monomer containing solution while maintaining the solution at a pH at which the hydrolysis of the vinyl ester which is present in the vinyl monomer is minimized, approximately 3.3±.5.

Other objects of the invention will be apparent to those skilled in the art from the following more detailed description.

The objects of this invention are attained by adding a mixture of sodium oxalate and hydrogen peroxide to shortstop the polymerization reaction prior to filtration.

The objects of this invention are attained by shortstopping the polymerization of vinyl monomers which comprises adding to an aqueous polymerization reaction mixture comprising vinyl monomers, polymer thereof, and a redox catalyst system, a mixture of a source of the oxalate ion which has a solubility in water of more than .01 gram per 100 ml. at 25° C., and is colorless in aqueous solution and hydrogen peroxide.

Substances which have been found suitable as sources of the oxalate ion include oxalic acid, the alkali metal salts of oxalic acid such as sodium, potassium, lithium and the mixed sodium potassium salt, the ammonium salt of oxalic acid, the magnesium salt of oxalic acid, the acid salts of the above, such as sodium hydrogen oxalate, potassium hydrogen oxalate, potassium tetraoxalate, ammonium acid oxalate etc. and any other substantially water soluble salts of oxalic acid which are colorless in aqueous solution, i.e. those having a solubility in water of at least .01 gram per 100 ml. at 25° C. All these suitable sources of the oxalate ion are effective as shortstopping agents in mixture with hydrogen peroxide.

It has been found that all the above oxalate-hydrogen peroxide shortstopping agents are very well suited for terminating the polymerization of vinyl monomers and recovering a substantially pure, unreacted monomer. The new oxalate-hydrogen peroxide shortstopping agents produce no adverse effect on any of the polymer physical properties, including color.

In accordance with the present invention the above defined oxalate-hydrogen peroxide shortstopping agents are employed to terminate the polymerization and enables recovery of substantially pure unreacted monomer of those vinyl compounds which undergo additional polymerization to form high molecular weight linear polymers, by which is meant that a large number of monomer molecules add onto one another to form a large molecule having a predominately linear structure. These vinyl monomers which undergo such polymerizations contain the characteristic structure $CH_2=C<$. Examples of this class of monomers include the aryl olefins such as styrene, the chloro-styrenes, p-methoxy styrene, alpha-methyl-styrene, vinyl naphthalene, and the like; acrylic acid and substituted acrylic acids and their esters, nitriles, and amides such as acrylic acid, methacrylic acid, methyl acrylate, ethyl acrylate, isobutyl acrylate, methyl-alpha-chloroacrylate, methyl methacrylate, ethyl methacrylate, butyl methacrylate, ethyl ethacrylate, isoamyl ethacrylate, acrylonitrile, methacrylonitrile, methacrylamide, and the like; methyl isopropenyl ketone, methyl vinyl ketone, methyl vinyl ether, vinyl ethinyl carbinols, vinylidene chloride, vinyl pyridine, vinyl acetate, vinyl chloride, vinyl furane, vinyl carbazole, fumaric acid esters, diallyl maleate, vinyl acetylene and esters, alcohols, acids, ethers and the like of the type described.

The oxalate-hydrogen peroxide shortstopping agents of the present invention are of excellent value in the controlled termination of the polymerization and recovery of substantially pure unreacted monomers when polymerizing a vinyl monomeric material comprising acrylonitrile with one or more other compounds containing the characteristic $CH_2=C<$ group which are copolymerizable therewith, such as, for example, the aryl olefins, particularly styrene, acrylic acid and substituted acrylic acids, esters, and amides, methylisopropenyl ketone, vinyl chloride, vinylidene chloride, vinyl acetate and similar compounds. Copolymerization of acrylonitrile and any of the above monomers find particular application in the field of synthetic fibers when composed of at least about 80 percent by weight of acrylonitrile and up to about 20 percent of one of the other vinyl monomers. The process of this invention is especially effective in rendering the recovery of a substantially pure unreacted monomer in which one of the vinyl monomers is a vinyl ester such as vinyl acetate, vinyl propionate, vinyl butyrate, vinyl valerate, vinyl pelargonate, vinyl stearate and vinyl laurate.

The above-defined oxalate-hydrogen peroxide shortstopping agents are found to be effective in the controlled termination of the addition polymerization reaction occurring when the vinyl polymerization materials are subjected to any of the well known methods of polymerization which are catalyzed by the redox catalysts system; those in which a catalyst-activator system is employed containing both an oxidizing and a reducing agent in which the activator is a water soluble oxidizable sulfoxy compound in which the valence of a sulfur atom does not exceed 4. Thus, the polymerization of the above defined vinyl monomeric materials can be carried out in a heterogenous system such as an aqueous emulsion or dispersion wherein the monomeric material is dispersed in a suitable liquid such as water, optionally with the aid of a suitable emulsifying agent, and polymerization is effected by adding the redox polymerization catalyst and activator and agitating until the polymer is formed. The shortstopping agents of the present invention are of particular value in the controlled termination of the polymerization reaction where the polymerization is conducted in a homogeneous system as by heating the monomeric material in a suitable solvent in the presence of redox polymerization catalyst-activator systems.

The oxalate-hydrogen peroxide shortstopping agents of the present invention have been found to be effective terminators and purifying agents for polymerizations and monomer recovery in which the redox catalyst system employs as a catalyst an oxygen-liberating compound of the type generally recognized as effective in vinyl polymerizations and as an activator a water soluble, oxidizable sulfoxy compound in which the valence of a sulfur atom does not exceed 4. In such redox systems the catalysts may, for example, comprise perborates, perchlorates, persulfates, persulfuric acid and perdisulfates. Likewise the activator may, for example, comprise inorganic oxidizable sulfoxy compounds, such as sulfur dioxide, sodium bisulfite, methabisulfite, sodium hydrosulfite and sodium thiosulfate or organic oxidizable sulfur compounds such as dialkyl sulfites, p-toluene sulfinic acids and formamidine sulfinic acids.

The method of carrying out the present invention consists in adding the oxalate-hydrogen peroxide shortstopping agent to a polymerizing reaction mixture when the physical properties of the existing polymer are those desired. Thus in the case of a batch polymerization the shortstopping agent can be added when the molecular weight of the polymer in the polymerization vessel reaches the desired value or the agents can be added at a definite time after the onset of polymerization to determine the physical properties produced after a given time interval. The oxalate-hydrogen peroxide shortstopping agents may be added directly to the polymerization vessel or to a subsequent holding vessel to which the reaction mixture is transferred in batch or semi-batch polymerization system. In the case of a continuous polymerization system the oxalate-hydrogen peroxide shortstopping agent may be added at any point past the polymerization vessel, such as the overflow pipe leading from the polymerization vessel to the holding tank. It should be added as quickly as possible when it is determined to shortstop the polymerization reaction. In a continuous polymerization system the rate of addition of the shortstopping agent is determined by the exit rate of the polymer in the polymerization medium and this in turn is governed by the feed rates of monomers, water, and catalyst and activator solutions.

The minimum amount of the oxalate ion added to effectively and rapidly terminate the polymerization reaction at the point desired is .64 equivalent of the amount of sulfur dioxide present in the polymerization reaction.

The sulfur dioxide sources which are added to the polymerization reaction are as pointed out hereinbefore, sulfur dioxide itself, sodium bisulfite, metabisulfite, sodium hydrosulfite, sodium thiosulfate, dialkyl sulfites, p-toluene sulfinic acids, formamidine sulfinic acids and any water soluble, oxidizable sulfoxy compound in which tht valence of a sulfur atom does not exceed 4. With the exception of sulfur dioxide itself, these compounds break down to sulfur dioxide when in an aqueous solution, e.g. in some instances the $SO_3$ ion is produced which combines water to produce sulfurous acid which breaks down into sulfur dioxide and water. The minimum amount of hydrogen peroxide added with the oxalate ion to rapidly terminate the polymerization is .19 equivalent of the amount of sulfur dioxide present in the polymerization reaction. While larger amounts of both the oxalate ion and hydrogen peroxide may be used, any large excess over the equivalents stated above is of no advantage and only adds to the final cost of the polymer. Therefore, in general, it is most preferred to employ amounts ranging from .64 to about 2 equivalents of oxalate ion and .19 to about 1 equivalent of hydrogen peroxide.

In order that those skilled in the art may better understand how the present invention can be carried into effect, the following examples are given by way of illustration and not by way of limitation. All parts and percentages are by weight unless otherwise stated.

*Example I*

A sample of a slurry withdrawn from the polymerization reaction of 91 percent acrylonitrile and 9 percent vinyl acetate in a persulfate-sulfur dioxide catalyst-activator system was treated with 1.27 equivalents of oxalate ion as an aqueous sodium oxalate solution and .30 equivalent of hydrogen peroxide, both based upon the amount of sulfur dioxide present in the polymerization reaction. The sample was filtered to remove any solid materials and after 30 minutes there was no polymerization in the filtrate. Additionally, after being stored for 20 days exposed to incident light, there was no polymerization in the filtrate.

*Example II*

A sample of a slurry withdrawn from the polymerization reaction of 91 percent acrylonitrile and 9 percent vinyl acetate in a persulfate-sulfur dioxide catalyst-activator system was treated with 1.27 equivalents of oxalate ion as an aqueous sodium oxalate solution and .10 equivalent of hydrogen peroxide, both based upon the amount of sulfur dioxide present in the polymerization reaction. The sample was filtered to remove solid materials, and after 30 minutes there was some polymerization in the filtrate.

*Example III*

A sample of a slurry withdrawn from the polymerization reaction of 91 percent acrylonitrile and 9 percent vinyl acetate in a persulfate-sulfur dioxide catalyst-activator system was treated with 1.27 equivalents of oxalate ion as an aqueous sodium oxalate solution and .20 equivalent of hydrogen peroxide, both based upon the amount of sulfur dioxide present in the polymerization reaction. The sample was filtered to remove any solid materials and after 30 minutes there was no polymerization in the filtrate. Additionally, after being stored for 20 days exposed to incident light, there was no polymerization in the filtrate.

*Example IV*

A sample of a slurry withdrawn from the polymerization reaction of 91 percent acrylonitrile and 9 percent vinyl acetate in a persulfate-sulfur dioxide catalyst-activator system was treated with 1.27 equivalents of oxalate ion as an aqueous sodium oxalate solution and .40 equivalent of hydrogen peroxide, both based upon the amount of sulfur dioxide present in the polymerization reaction. The sample was filtered to remove any solid materials after 30 minutes there was no polymerization in the filtrate. Additionally, after being stored for 20 days exposed to incident light, there was no polymerization in the filtrate.

*Example V*

A sample of a slurry withdrawn from the polymerization reaction of 91 percent acrylonitrile and 9 percent vinyl acetate in a persulfate-sulfur dioxide catalyst-activator system, was treated with .76 equivalent of oxalate ion as an aqueous sodium oxalate solution and .30 equivalent of hydrogen peroxide, both based upon the amount of sulfur dioxide present in the polymerization reaction. The sample was filtered to remove any solid materials and after 30 minutes there was no polymerization in the filtrate. Additionally, after being stored for 20 days exposed to incident light, there was no polymerization in the filtrate.

*Example VI*

A sample of a slurry withdrawn from the polymerization reaction of 91 percent acrylonitrile and 9 percent vinyl acetate in a persulfate-sulfur dioxide catalyst-activator system was treated with 1.27 equivalents oxalate ion as an aqueous sodium oxalate solution, based upon the amount of sulfur dioxide present in the polymerization reaction. The hydrogen peroxide additive was not used in this example. The sample was filtered to remove any solid materials and after 30 minutes there was some polymerization. Thus, without using a mixture of both the oxalate ion and hydrogen peroxide in proper proportions there is no effective and rapid shortstopping of the polymerization reaction.

We claim:

1. The method of terminating the polymerization reaction of vinyl monomers in the presence of a redox catalyst system comprising a water soluble oxidizable sulfoxy compound in which the valence of a sulfur atom does not exceed 4, comprising subjecting the polymerization reaction to the action of a mixture of at least .64 equivalent of oxalate ion, based on the total amount of sulfur dioxide present in the polymerization reaction, and at least .19 equivalent of hydrogen peroxide, based on the total amount of sulfur dioxide present in the polymerization reaction.

2. The method of claim 1 in which the oxalate ion is from .64 to 2 equivalents of sulfur dioxide present in the polymerization reaction and hydrogen peroxide is from .19 to 1 equivalent of sulfur dioxide present in the polymerization reaction.

3. The process of claim 1 in which the source of oxalate ion in the oxalate-hydrogen peroxide terminating mixture is oxalic acid.

4. The process of claim 1 in which the source of oxalate ion in the oxalate-hydrogen peroxide terminating mixture is sodium oxalate.

5. The process of claim 1 in which the source of oxalate ion in the oxalate-hydrogen peroxide terminating mixture is potassium oxalate.

6. The process of claim 1 in which the source of oxalate ion in the oxalate-hydrogen peroxide terminating mixture is ammonium oxalate.

7. The process of claim 1 in which the source of oxalate ion in the oxalate-hydrogen peroxide terminating mixture is magnesium oxalate.

8. The method of terminating the co-polymerization of acrylonitrile and a vinyl carboxylate in the presence of a redox catalyst system comprising a water soluble oxidizable sulfoxy compound in which the valence of a sulfur atom does not exceed 4, comprising subjecting the polymerization reaction to the mixture of from .64 to 2 equivalents of oxalate ion and from .19 to 1 equivalent of hydrogen peroxide, both based upon the total amount of sulfur dioxide present in the polymerization reaction.

9. The method of terminating the co-polymerization of acrylonitrile and vinyl acetate in the presence of a redox catalyst system comprising a water soluble oxidizable sulfoxy compound in which the valence of a sulfur atom does not exceed 4, comprising subjecting the polymerization reaction to the action of a mixture of from .64 to 2 equivalents of oxalate ion and from .19 to 1 equivalent of hydrogen peroxide, both based upon the total amount of sulfur dioxide present in the polymerization reaction.

10. The method of terminating the co-polymerization of at least 80 percent acrylonitrile and up to 20 percent of vinyl acetate in the presence of a redox catalyst system comprising a water soluble oxidizable sulfoxy compound in which the valence of a sulfur atom does not exceed 4, comprising subjecting the polymerization reaction to the action of a mixture of .64 to 2 equivalents of oxalate ion and from .19 to 1 equivalent of hydrogen peroxide, both based on the total amount of sulfur dioxide present in the polymerization reaction.

References Cited in the file of this patent
UNITED STATES PATENTS

| | | |
|---|---|---|
| 2,629,711 | Stamin et al. | Feb. 24, 1953 |
| 2,662,878 | Bryant | Dec. 15, 1953 |
| 2,770,603 | Lynch | Nov. 13, 1956 |
| 2,911,397 | Janssen | Nov. 3, 1959 |

OTHER REFERENCES

Billmeyer: Textbook of Polymer Chemistry Interscience, pub. New York, 1957, pp. 254–5.

Urakawa et al.: Chemical Abstracts, volume 46, page 4843 (1952).

Subramanian et al.: Makromolekulare Chemie, volume 22, pages 147–162 (1957).